Oct. 2, 1928.  
W. B. ANDERSSON  
1,685,933
HYDRAULIC GATE AND CHECK VALVE
Filed March 14, 1927  2 Sheets-Sheet 1
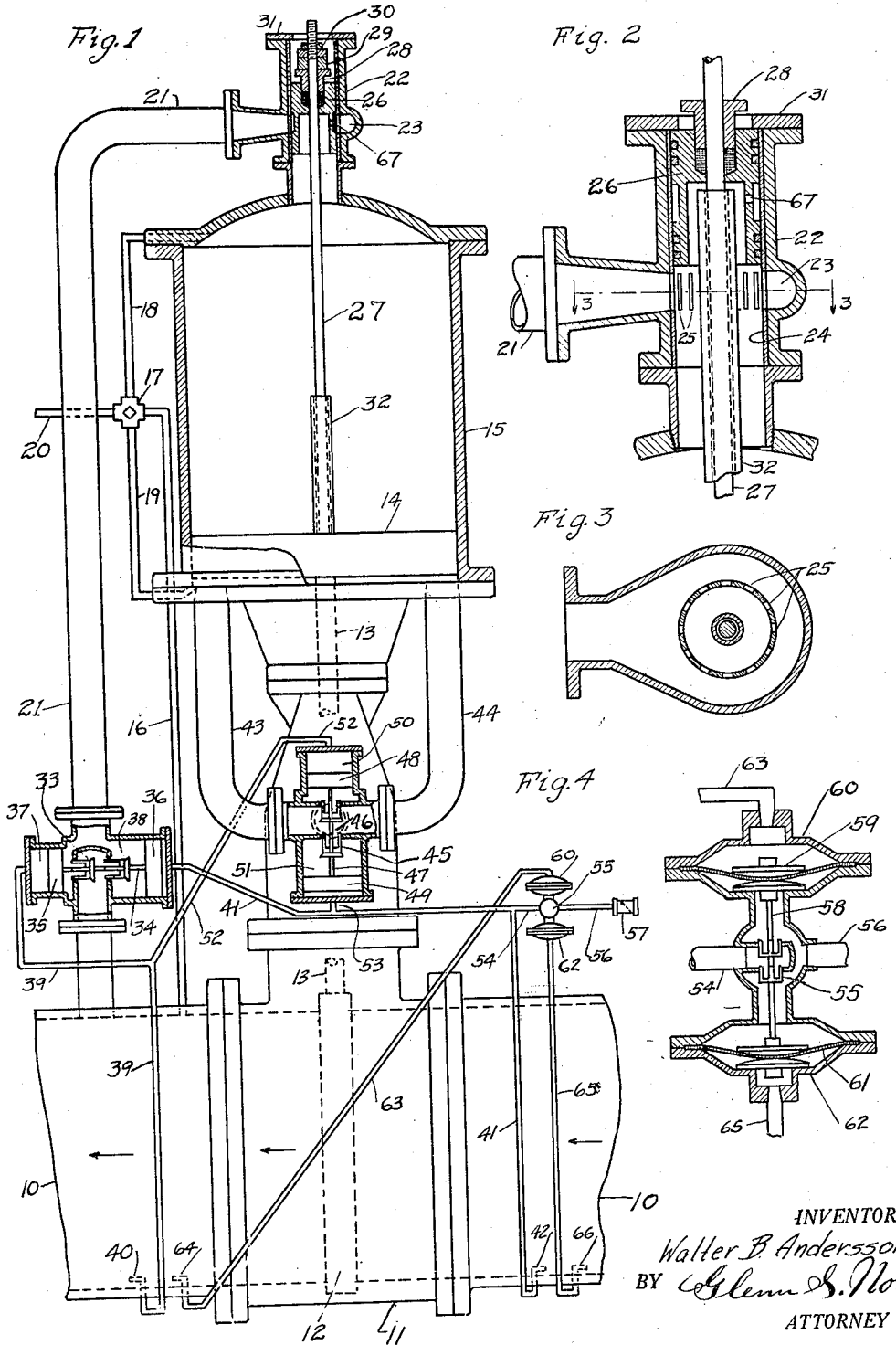
INVENTOR.  
Walter B. Andersson  
BY Glenn S. Noble  
ATTORNEY Oct. 2, 1928.
W. B. ANDERSSON
HYDRAULIC GATE AND CHECK VALVE
Filed March 14, 1927 2 Sheets-Sheet 2
1,685,933
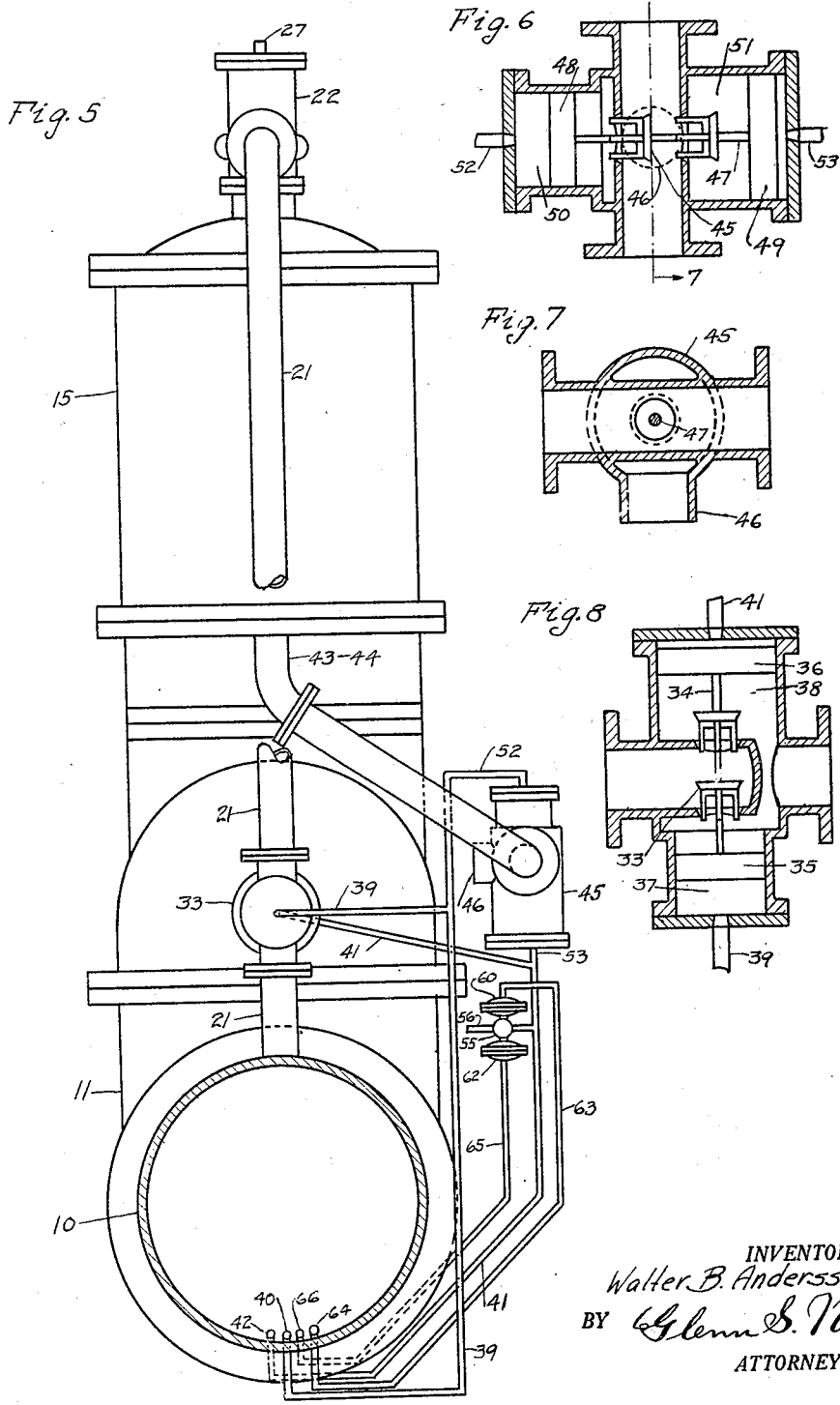
INVENTOR.
Walter B. Andersson
BY Glenn S. Noble
ATTORNEY Patented Oct. 2, 1928.

1,685,933

UNITED STATES PATENT OFFICE.

WALTER B. ANDERSSON, OF CHICAGO, ILLINOIS.

HYDRAULIC GATE AND CHECK VALVE.

Application filed March 14, 1927. Serial No. 175,286.

In water works in which water is pumped by centrifugal pumps, it is desirable to have a check valve in addition to the regular gate valve in order to prevent any return or back flow of the water in the event of the accidental stopping of the pump or if the pump fails to maintain the necessary pressure in the mains. Such check valves have been found objectionable for various reasons, and are also very expensive if made sufficiently large for large water mains, such as used in the water works of the larger cities.

The present invention relates to valves particularly adapted for use in water mains and automatic means for controlling such valves in the event of the accidental stopping of the pump or reduction of pressure or reduced rate of flow of the water in the main.

The objects of this invention are to provide an improved apparatus for use in connection with water systems; to provide a pipe closure and means for actuating the closure under certain predetermined conditions; to provide a valve for the outlet pipe of a pump and means whereby the valve may be manually or automatically actuated; to provide a valve for a water main with a piston and cylinder for actuating the same and means for controlling the flow of fluid from the main to the cylinder; and to provide such other novel features in construction and improvements in operating mechanism as will appear more fully from the following description taken in connection with the accompanying drawings, in which, Figure 1 is a plan view with parts broken away to show the interior construction;

Figure 2 is an enlarged sectional detail of one of the controlling valves;

Figure 3 is a section taken on the line 3—3 of Figure 2;

Figure 4 is an enlarged detail of another valve and its operating mechanism;

Figure 5 is a side view or view from the left hand side of Figure 1 with parts broken away or shown diagrammatically for convenience in illustration;

Figure 6 is an enlarged sectional detail of another valve;

Figure 7 is a sectional view taken on the line 7—7 of Figure 6; and

Figure 8 is a sectional detail of another valve.

In the particular form of the apparatus as illustrated in these drawings, 10 represents a pipe or main for conducting fluid, such as the main of a water works systems or outlet pipe of a pump. This main is provided with a valve 11 which may be of any suitable type for closing the main but which for convenience is illustrated as a gate valve which is closed by a gate 12. The valve 11 is actuated by means of a cylinder and piston which may be operatively connected therewith in any desired manner. As shown, the gate or valve 12 is connected by a rod 13 with a piston 14 which operates in a cylinder 15, these parts being supported in any convenient manner, as by connecting castings or body members, as illustrated. A pipe 16 leads from the main 10 to a four-way valve 17 having one connection 18 to one end of the cylinder and another connection 19 to the opposite end of the cylinder and an outlet pipe 20 which may lead to the atmosphere. The piston is manually controlled for opening and closing the main valve by turning the valve 17. When this valve is turned to one position, the water or fluid from the main will pass through the pipe 16 and pipe 18 to one end of the cylinder, thereby forcing the piston down, for instance, as shown in Figure 1. At such time the valve 17 provides a free opening from the pipe 19 through the pipe 20 to the atmosphere or any suitable drain so that there is no pressure on the opposite face of the piston. When the main valve is to be opened, the four-way valve 17 is turned so that the water will pass from the pipe 16 through the pipe 19 to the opposite end of the cylinder, and the outer end will at such time be open to the atmosphere. The apparatus for effecting the automatic closing of the main valve is connected with the main, and the cylinder, and is controlled by the flow or pressure in the main.

A pipe 21 leads from the pipe 10 from a point below or on the "down stream" side of the valve 11 to an inlet controlling valve 22 in the head of the cylinder 15, as shown in Figure 1, the arrangement being such that this valve controls the flow of water through the pipe 21 to the outer end of the cylinder. This valve is preferably of the piston type and comprises a cylindrical body having an annular inlet opening 23 which is connected directly with the pipe 21. A sleeve 24 is arranged in the valve body and has a number of slots 25 to permit the water to pass from the inlet 23 into the valve or to the outlet. The valve is opened and closed by a piston valve member 26 which is adapted to move longitudinally in the sleeve 24, such sleeve with the slots therethrough being provided to permit the piston with its rings to pass the annular opening 23. This valve is shown with the piston closure in closed position in Figure 1, and in open position in Figure 2. A piston rod 27, which is commonly designated as a "tell-tale rod" is secured to the piston 14 and extends outwardly through the valve 22. This rod passes through the piston or valve member 26 and is provided with a gland or stuffing box 28 to prevent the leakage of water. The rod 27 has a rubber washer 29 and adjusting nut 30 which are adapted to engage with the gland or valve member 26 to close the valve 22 when the piston 14 approaches the end of its inward or closing stroke. I prefer to adjust these parts so that the valve 22 will be closed when the piston 14 is about two inches from the end of the stroke in order to prevent undue strain or pounding on the main valve 11 as it is closed. If the piston is stopped shortly before the main valve 11 is closed, such main valve may then be closed manually if desired, or by providing a small hole 67 in the piston 26, the water will gradually close the valve. The valve 22 is opened and also urged toward open position by the pressure in the cylinder and is also acted on by the rod 27, as the friction of the rod passing through the gland will ordinarily be sufficient to move the piston valve member 26 outwardly until it is stopped by the annular projection or ring 31, as shown in Figure 2. However, in the event of the failure of the friction being sufficient to open the valve, I provide a pipe or sleeve 32 on the rod 27 which is adapted to engage with the piston valve 26 and move it to open position when the piston 14 moves outwardly.

The flow through the pipe 21 is further controlled by a valve 33, preferably of the balanced type having a rod 34 which is adapted to be actuated by a piston 35 at one end and a larger piston 36 at the opposite end. These pistons operate respectively in cylinders 37 and 38, forming a part of the valve body. The outer end of the cylinder 37 is connected by a pipe 39 with a nozzle 40 which is positioned in the pipe 10 with its open end directed down stream or away from the pump, as shown in Figure 1. The outer end of the cylinder 38 is connected by a pipe 41 with a nozzle 42 in the pipe 10, which nozzle is directed up stream or toward the pump and positioned on the up-stream side of the main valve 11.

The cylinder 15 is preferably provided with two outlet or exhaust pipes 43 and 44 which lead to a valve 45, preferably of the balanced type and having an outlet 46 leading to the atmosphere or to a drain. The valve stem 47 has a piston 48 at one end and a larger piston 49 at the opposite end, these pistons coacting respectively with cylinders 50 and 51. The outer end of the cylinder 50 is connected by a pipe 52 with the pipe 39. The outer end of the cylinder 51 is connected by a pipe or connection 53 with the pipe 41.

A pipe 54 leads from the pipe 41 to a valve 55 which is preferably of the balanced type and which is provided with an outlet pipe 56 which may lead to the inlet of the pump or to the atmosphere. If it leads to the atmosphere, it is provided with a check valve 57 to prevent air from returning therethrough. The valve stem 58 of the valve 55 is connected at one end with a diaphragm 59 in a diaphragm chamber 60 and is connected at the other end with a diaphragm 61 in a diaphragm chamber 62. The outer portion of the diaphragm chamber 60 is connected by a pipe 63 with a nozzle 64, which is pointed down stream and positioned on the down stream side of the main valve, as shown in Figure 1. The outer portion of the chamber 62 is connected by a pipe 65 with a nozzle 66 in the pipe 10 on the up-stream side of the valve 11 and having its open end directed up stream or toward the pump. The various nozzles in the pipe 10 are positioned with respect to the inner periphery of the pipe so that they will have the proper controlling effect and are preferably arranged on the side adjacent to the portion of the gate 12 which opens first so that they will have the full effect of the flow as soon as the valve starts to open.

When the pump is running and the main valve 11 is open, the piston 14 will be at the outer end of the cylinder 15 and the valve 22 will also be open. At this time the four-way valve 17 may be set in neutral position so that no fluid is admitted to either end of the cylinder or may be set to connect the inner end of the cylinder with the main or supply line 10, and to open the outer end of the cylinder to the drain. The valve 55 is held closed by the difference in pressure in the lines or pipes 65 and 63. This valve is preferably small, as for instance three-fourths of an inch or less and the available difference in pressures acting through the relatively large diaphragms is sufficient to hold the valve tightly closed. At this time the pipe 54 is closed to the atmosphere and the pressure in the pipes 41 and 53 acting through the pistons 36 and 49 will hold the respective valves 33 and 45 closed.

If the valve for the main or supply pipe 10 is being closed by the manual control valve 17, the valves 33, 45 and 55 remain closed as the pump will still be running, but when the main valve is completely closed and the pump is stopped, these valves will open but the valve 22 is then closed and the valve 45 in the discharging line is preferably so located that it will not drain the cylinder and consequently there is no flow through the valve.

When the pump is started, there will be a flow through the pipes 41 and 54, through the valve 55 to the atmosphere or to the pump suction, but as the pressure is gradually built up in the pipe 65 the valve 55 will be closed, thereby cutting off this outlet. Then as the pressure in the pipes 41 and 53 increases, the pressure on the relatively large pistons 36 and 49 will close the valves 33 and 45. The main valve 11 may then be opened by the manually actuated opening devices.

When the apparatus actuates as a check valve, the main valve 11 will be open and the valves 33, 45 and 55 will be closed. If an accident occurs to the pumps or prime mover or to the main on the up-stream side of the main valve 11, or if for any reason the flow through the main is sufficiently reduced, the pressure in the pipe 65 becomes sufficiently reduced so that the pressure in the pipe 63 will open the valve 55, which releases the pressure in the pipes 54 and 41. The valves 33 and 45 are then opened and water is admitted to the outer end of the cylinder 15 and drained out at the inner end, and the piston 14 moves inwardly and closes the main valve. The valve 22 is preferably arranged so that it is held open until the piston is about four inches from the end of the stroke, when it will be closed, thereby closing the supply line to the cylinder when the piston is about two inches from the end of the stroke. If the valve 11 is an ordinary gate valve, it will, in most cases, travel a short distance further, due to the inertia of the moving parts, and as above described, the valve will be stopped slightly before it is entirely closed.

With this arrangement, the small valve 55, which may be readily actuated and which may be held securely in closed position by a relatively small amount of power or pressure, serves to control or cooperates with the larger valves 33 and 45 so that the pistons for each of these valves may be of different sizes in order to give the necessary seat pressure to hold the valve tight. This, therefore, provides a series of pressure-responsive devices which operate successively in order to perform the proper closing of the closure in the water main.

By means of my improved apparatus, it will be seen that I provide a valve mechanism and controlling means whereby a single valve may, if desired, be utilized both as an ordinary shut-off valve and as a check to prevent backflow through the pipes. It will also be noted that different instrumentalities may be utilized for actuating the several valves, the pistons and diaphragms being illustrative of the best or well known means for this purpose, and other changes may be made in the details of construction or arrangement of the parts to adapt the controlling mechanism to different types of valves in the main line or to different conditions, and therefore I do not wish to be limited to the exact arrangement herein shown and described, except as specified in the following claims, in which I claim:

1. The combination with a water main, of a valve for closing the same, a cylinder and piston for actuating the valve, a connection from the main to the cylinder, valves for controlling the cylinder inlet and outlets, fluid operated means for actuating said valves, connections from the main to the fluid operating means, an outlet valve for said fluid operated means, means for actuating the outlet valve, pipes connected with said actuating means, and nozzles connected with the pipes and positioned at different points in the main, as and for the purpose described.

2. The combination with a water main, of a valve, a cylinder and piston for actuating said valve, a pipe leading from the down-stream side of the valve to the outer end of the cylinder, a valve for controlling the flow from said pipe to the cylinder, means actuated by the piston for opening and closing said valve, a second valve for said pipe, differential actuating means for opening and closing said valve, a pipe leading from the opening means to the water main, a nozzle on said pipe, directed down-stream, and positioned on the down-stream side of the main valve, an outlet pipe for the cylinder, a valve for said pipe, differential means for opening and closing said valve, a pipe leading from the opening, means connected with the pipe from said last named opening means, a nozzle directed up stream on the up-stream side of the main valve, pipes leading from said nozzle to the closing means of the last named valves, an outlet pipe from the last named pipe, a valve for said outlet pipe, opening means and closing means for said last named valve, a nozzle in the down-stream side of the main, a pipe from said nozzle to the opening means of said last named valve, a nozzle directed up stream in the main on the up-stream side of the main valve, and a pipe leading from said nozzle to the closing means of the last named valve.

3. An apparatus of the character set forth, comprising a water main, a valve for said main, a cylinder and a piston for actuating said valve, a pipe from the main to the cylinder for admitting water to close the valve, an outlet for said cylinder, a valve actuated by the piston for reducing the flow through the pipe before the main valve is completely closed and opening the pipe when the main valve is opened, a second valve in said pipe, an outlet valve for the cylinder, pressure-responsive means for opening and closing said last named valves, connections between said means and the main line for supplying pressure under predetermined conditions, an outlet connected with the closing means for said last named valves, a valve in said outlet, pressure-responsive means for opening and closing said valve, and connections from said pressure-responsive means to the main line for actuating the last named valve under predetermined conditions.

4. An actuating device of the character set forth having inlet and outlet valves adapted to be opened and closed by pressure-responsive means, said means being connected to and receiving their pressure from the main conduit, a relatively small valve, means for connecting the valve with the main conduit for actuating the same by differential pressure at two points in the main conduit, said last named valve serving to release the pressure in the closing means of the first named valves under predetermined conditions.

5. The combination with a water main, of a pressure-responsive device for opening and closing the main, pressure-responsive devices for controlling the inlet and outlet of the first named device, all of said devices receiving their pressure fluid from the water main, and a pressure responsive device connected with the main at two different points and adapted to be actuated by the differential pressure for reducing the pressure in the closing means of the pressure responsive devices for controlling said inlet and outlet, substantially as described.

WALTER B. ANDERSSON.